United States Patent [19]

Nayar et al.

[11] Patent Number: 4,912,336
[45] Date of Patent: Mar. 27, 1990

[54] SURFACE SHAPE AND REFLECTANCE EXTRACTION SYSTEM

[75] Inventors: Shree K. Nayar; Katsushi Ikeuchi; Takeo Kanade, all of Pittsburgh, Pa.

[73] Assignee: Westinghouse Electric Corp., Pittsburgh, Pa.

[21] Appl. No.: 313,212

[22] Filed: Feb. 21, 1989

[51] Int. Cl.$^4$ ............................................. G01N 21/86
[52] U.S. Cl. .................................... 250/560; 356/376
[58] Field of Search ............... 250/560, 561; 356/376, 356/381, 384, 386, 387

[56] References Cited

U.S. PATENT DOCUMENTS

| | | | |
|---|---|---|---|
| 4,745,292 | 5/1988 | Ericsson | 250/560 |
| 4,758,730 | 7/1988 | Bazin et al. | 356/376 |
| 4,792,696 | 12/1988 | Kender et al. | 250/560 |

Primary Examiner—David C. Nelms
Attorney, Agent, or Firm—W. G. Sutcliff

[57] ABSTRACT

An photometric sampling apparatus for an object surface shape and reflectance extraction system includes an array of point light sources spaced apart from one another in an arcuate configuration about a common site at which an object is placed from inspection, an array of extended light sources spaced apart from one another in an arcuate configuration about and oriented in different directions toward the common site, and a viewing device for viewing the object from a single direction when placed at the common site in order to extract information corresponding to the image of the object viewed. The array of point light sources can be activated for emitting light therefrom along different orientation angles toward the object at the common site. The array of extended light sources are generated on the surface of a light-diffusing medium, such as a translucent globe, disposed between the array of point light sources and common site. Each extended source emits light from an area of points unlike each point source which emits light from a single point. A scanner device is connected to the point light sources for sequentially activating them to emit light therefrom. In response to the sequence of emitted light, the extended light sources are generated in a scanning fashion for producing a sequence of images of the object at the viewing device.

18 Claims, 4 Drawing Sheets

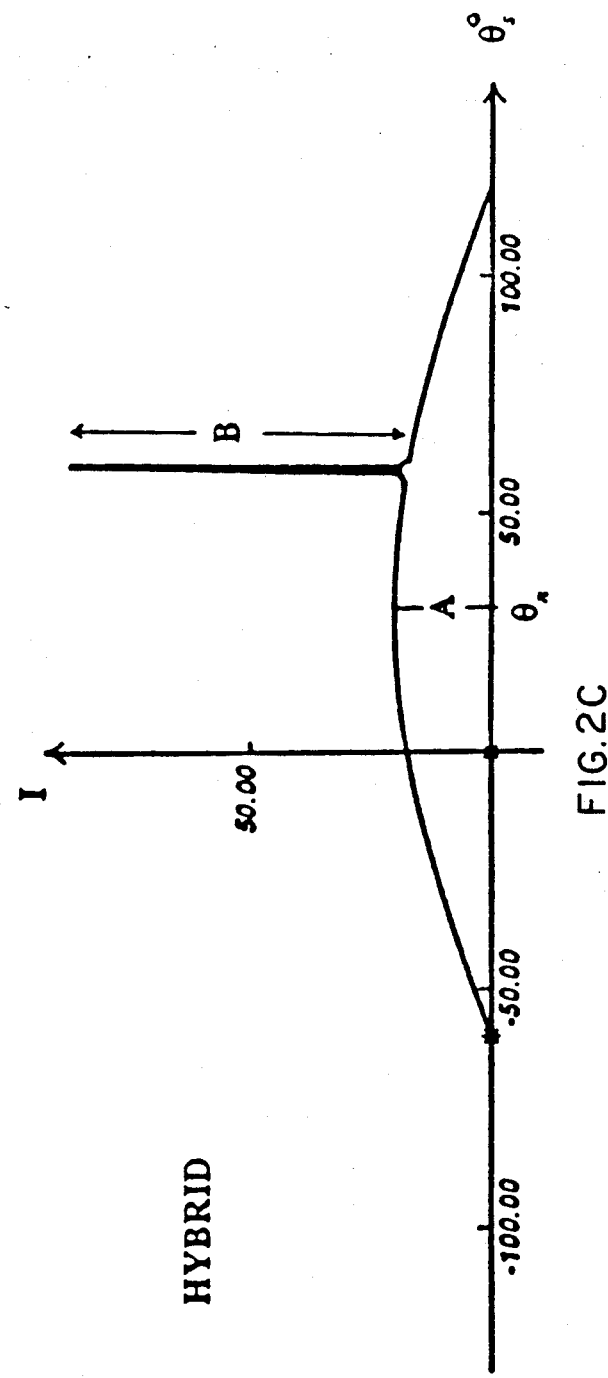

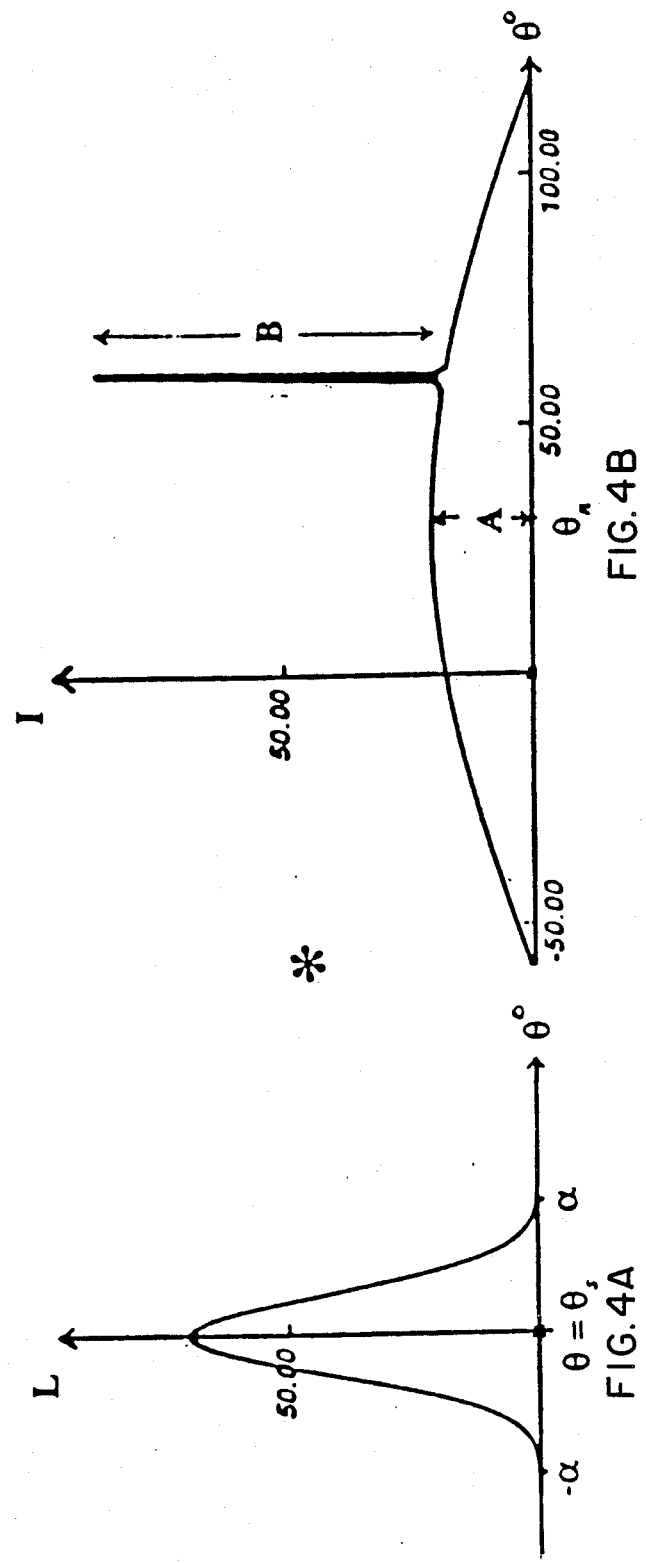

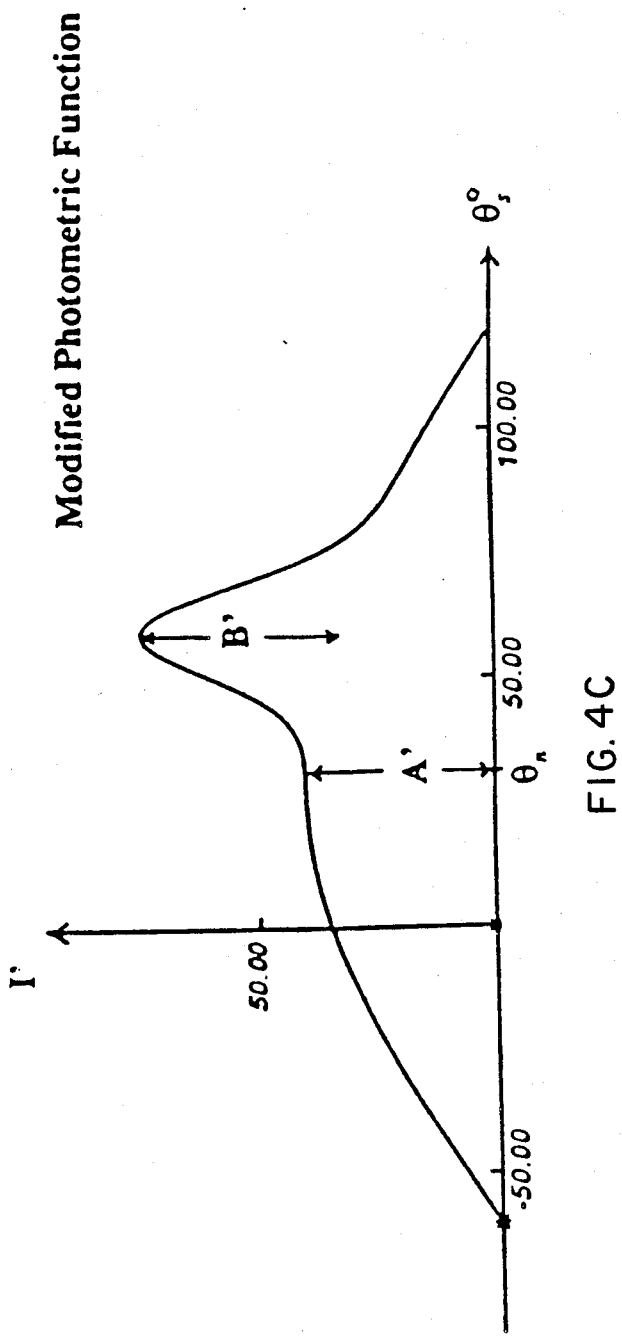

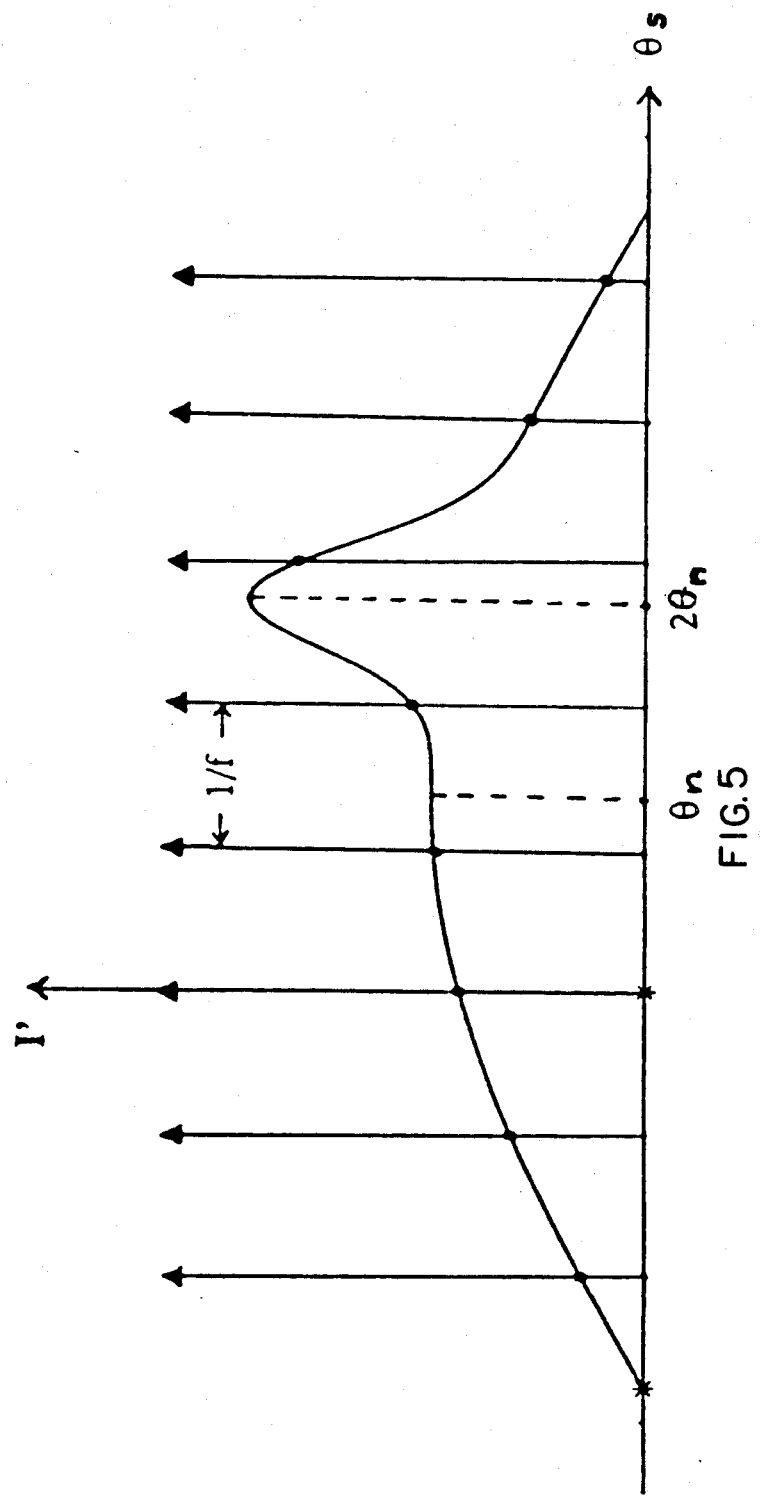

SURFACE SHAPE AND REFLECTANCE EXTRACTION SYSTEM

CROSS REFERENCE TO RELATED APPLICATION

Reference is hereby made to the following copending application dealing with related subject matter and assigned to the assignee of the present invention: "Solder Joint Inspection System" by A. C. Sanderson et al, assigned U.S. Ser. No. 160,562 and filed Feb. 25, 1988, now U.S. Pat. No. 4,876,455.

BACKGROUND OF THE INVENTION

1. Field of the Invention

The present invention relates generally to photometric sampling techniques and, more particularly, is concerned with photometric sampling apparatus and method for extracting shape and reflectance properties of object surfaces.

2. Description of the Prior Art

Surface inspection is a vision application area that has great industrial significance. Inspection of machined parts, solder joint surfaces, and plastic sheets are just a few examples of industrial tasks that are laborious for humans to perform. Often, defects in the manufactured parts are too subtle to be detected by the human eye. Automated inspection systems promise to play an important and vital role in industry.

A typical inspection system first attempts to extract surface properties of the objects placed in its view. Subsequently, the system recognizes the objects on the basis of the extracted properties, and classifies them into end-application types. A key step in the process of surface inspection is extracting the surface shape.

Prior shape extraction techniques that are based on photometric measurements rely on assumed models of surface reflection. However, in many vision applications, the reflectance properties of object surfaces are not readily available. These prior techniques are unable to furnish information regarding the reflectance properties of the object surface without the aid of prior knowledge of the relative strengths of the Lambertian and specular components of surface reflection. While these techniques may be applied to specific tasks, they lack the ability to adapt to variations in the reflection properties of the inspected surfaces.

In many industrial applications, surface polish and surface roughness are found to be important inspection criteria. In such cases, surface reflectance properties may be interpreted as measures of surface polish and roughness. Further, reflectance properties may be used to segment an image in different regions; each region may be regarded as a different surface to aid the process of inspection. Thus, in actual practice, it can be expected that the extraction of surface shapes of varying reflectance characteristics will be required. As mentioned earlier, in use of the prior extraction techniques the reflection properties of the inspected surfaces must be known a-priori in order to determine surface shape. This common characteristic of all existing extraction methods is a significant drawback which considerably limits the versatility of inspection systems that are currently used in production lines.

Consequently, a need exists for an alternative approach to surface shape and reflectance extraction which overcomes the drawback of existing methods. It is highly desired to have a technique that can extract the shape of Lambertian, specular, and hybrid surfaces and, in addition thereto, also estimate the reflectance properties of each surface point.

SUMMARY OF THE INVENTION

The present invention provides surface shape and reflectance extraction apparatus and method designed to satisfy the aforementioned needs. The apparatus and method of the present invention incorporates a unique "photometric sampling" technique which extracts surface shapes with varying reflectance properties; these properties may range from Lambertian (diffuse) to specular (shiny). The apparatus and method also are used to determine the parameters of the reflectance model at each surface point.

In accordance with the present invention, the photometric sampling technique employs extended light sources to illuminate the object surface. Surface illumination using extended light sources makes it possible to ensure the detection of both Lambertian and specular reflections. Thus, using extended sources makes it feasible to extract surface shape without making assumptions regarding the relative strengths of the Lambertian and specular components of surface reflectance.

More particularly, the object illuminated by using an array of extended light sources and the object surface is viewed from a single direction by a television camera. The objective is to extract surface properties by changing the source direction while keeping the viewing direction constant. An extended light source is generated by placing a layer of light-diffusing material between the object and a point source of light. The array of the extended light sources is oriented in multiple directions relative to the object and sequentially scanned and an image sequence of the object is obtained by changing the extended source position.

Further, the image of the object for each extended source in the array is digitized and stored in memory. An extraction algorithm is employed which uses the digitized information representing the sequence of images to compute orientations as well as the relative strengths of the Lambertian and specular components of reflection. Specifically, the extraction algorithm uses a set of image intensity values recorded at each surface point, resulting from the array of sources, to locally estimate orientation and reflectance information or model of that surface point.

These and other features and advantages of the present invention will become apparent to those skilled in the art upon a reading of the following detailed description when taken in conjunction with the drawings wherein there is shown and described an illustrative embodiment of the invention.

BRIEF DESCRIPTION OF THE DRAWINGS

In the course of the following detailed description, reference will be made to the attached drawings in which:

FIGS. 2a, 2b and 2c are diagrams of plots of the photometric functions for Lambertian, specular, and hybrid surfaces.

FIGS. 4a, 4b and 4c are diagrams of plots of the extended source radiance and basic photometric functions and of the modified photometric function obtained by convolving the basic photometric function with the extended source radiance function.

FIG. 5 is a diagram of sampling the modified photometric function.

DETAILED DESCRIPTION OF THE INVENTION

Figure 1:
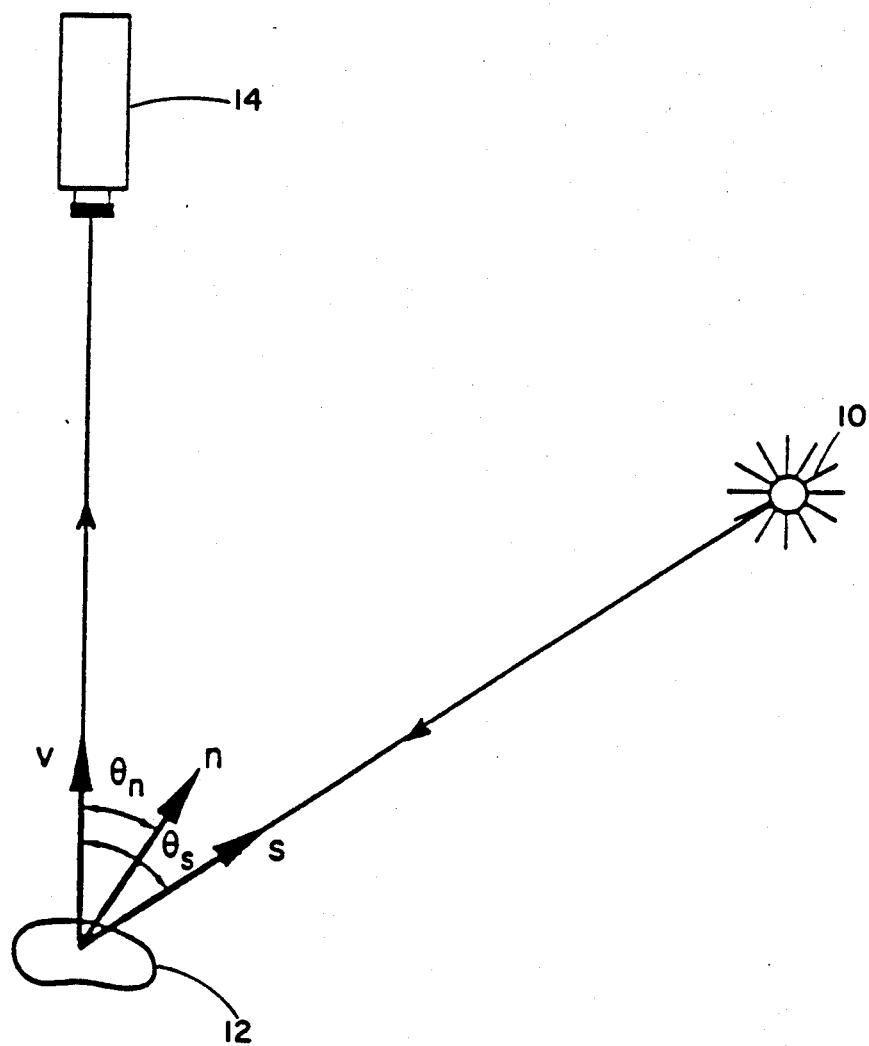
FIG. 1 is a simplified schematic representation of light from a point source illuminating an object surface and being reflected by the object surface into a viewing camera.

In the following description, like reference characters designate like or corresponding parts throughout the several views of the drawings. Also in the following description, it is to be understood that such terms as "forward", "rearward", "left", "right", "upwardly", "downwardly", and the like, are words of convenience and are not to be construed as limiting terms.

PHOTOMETRIC SAMPLING

Introduction

The intensity distribution in the image of an object is closely related to the reflectance properties and shape of the object surface, and the characteristics of the light source used to illuminate the object. The basic photometric function is defined as one that relates image intensity to surface orientation, surface reflectance, and source position for point source illumination of the surface. Point light sources are most often used to illuminate a scene of interest. However, the ease of using point sources comes with the inability to capture, in the image intensities, the information that is required to extract surface features such as shape and reflectance.

The present invention employs an extended light source illumination technique to overcome the inadequacies of point source illumination. The basic photometric function is modified for object illumination using extended sources. Samples of the modified photometric function may be obtained by illuminating the surface from different directions. An algorithm is used for determining surface orientation and reflectance properties from the measured photometric samples. For ease of description, photometric sampling is described herein by using a two-dimensional illumination and imaging geometry. These results also apply to three dimensions.

Point Light Source

FIG. 1 is a simplified schematic representation of an apparatus wherein light from a point source 10 illuminates an element of an object surface 12 and is reflected by the object surface into a viewing camera 14.

In illuminating the object surface. 12, the point source 10 emits light in all directions. A fraction of the light energy incident upon the object surface 12 is absorbed by the object while the remaining energy is reflected by the surface. Light energy reflected by the surface 12 in the direction of the camera 14 causes an image of the surface to be formed in the camera. For orthographic projection, all light rays entering the camera 14 are parallel and thus the viewing direction is constant over the entire field of view.

Basic Photometric Function

The basic photometric function relates image intensity to surface orientation, surface reflectance, and source direction. For a given orientation of the object surface 12 and direction of the point source 10, the amount of light energy reflected by the surface in a particular direction is determined by the reflectance properties of the surface. The reflectance model of most surfaces is constituted of two components, namely, the Lambertian (diffuse) component and the specular (gloss or shiny) component. A Lambertian surface is one which appears equally bright from all viewing directions. An example of a Lambertian surface would be the surface of a piece of tissue paper. A specular surface is one that only reflects light if the viewing angle is the angle of reflection. A typical example of a specular surface would be a surface plated with chrome.

In general, the energy of light reflected by a surface in any direction is a combination of the Lambertian and specular components. Therefore, the intensity at an image point may be expressed as:

$$I = IL + IS,  \quad (1)$$

where IL is the image intensity due to Lambertian reflection and IS is the image intensity due to specular reflection. The Lambertian and specular components of image intensity can be expressed in terms of the parameters that describe the two-dimensional imaging and illumination geometry shown in FIG. 1. The result can be extended to the three dimensional case. In two dimensions, the source direction vector s, surface normal vector n, and viewing direction vector v lie in the same plane. Therefore, any direction may be represented by a single parameter, namely, the zenith angle $\theta$.

The Lambertian component IL results from the non-homogeneous nature of the object surface. Light rays penetrating the surface undergo multiple refractions and reflections and reemerge near the point of entry with a variety of directions. These surfaces appear equally bright from all directions; thus, the intensity component IL is independent of the viewing direction. However, the brightness of a Lambertian surface point is proportional to the energy of incident light. As seen in FIG. 1, the amount of light energy falling on the element of the object surface 12 is proportional to the area of the surface element as seen from the point source position. The Lambertian intensity component IL is a function of the surface orientation (or normal) direction $\theta_n$ and the source direction $\theta_s$, while it is independent of the viewing direction:

$$IL = A \cos(\theta_s - \theta_n). \quad (2)$$

The specular component IS is maximum when the angle of incidence of light equals the angle of reflection of light. For a given source direction, viewing direction, and surface normal direction, IS may be represented by the function:

$$IS = B [\cos(\theta_s - 2\theta_n)]^k. \quad (3)$$

The parameter k in equation (3) represents the sharpness of specularity. From a large number of experiments it has been observed that k>20 for most surfaces that have a specular component of reflection. For the specular model the assumption is that the surface is smooth. The resulting specular intensity IS is a very sharp function of the source direction $\theta_s$. For all practical purposes, IS may be written as:

$$IS = B \, u(\theta_s - 2\theta_n) \quad (4)$$

-continued
where, $$u(\theta_s - 2\theta_n) = \lim_{E \to 0} \int_{\theta_s-E}^{\theta_s+E} \delta(\theta - 2\theta_n) \, d\theta = \begin{cases} 1 & \text{if } \theta_s = 2\theta_n \\ 0 & \text{otherwise} \end{cases}$$

As mentioned above, the basic photometric function relates image intensity to surface orientation, surface reflectance, and source direction. The basic photometric function may be written by substituting equations (2) and (4) in equation (1):

$$I = A \cos(\theta_s - \theta_n) + B \, u(0_s - 20_n). \tag{5}$$

The constants A and B in equations (2), (3) and (5) represent the relative strengths of the Lambertian and specular components of reflection. For example, $A>0$ and $B=0$ for a purely Lambertian surface, $A=0$ and $B>0$ for a purely specular surface, and $A>0$ and $B>0$ for a hybrid surface.

Figure 2A:
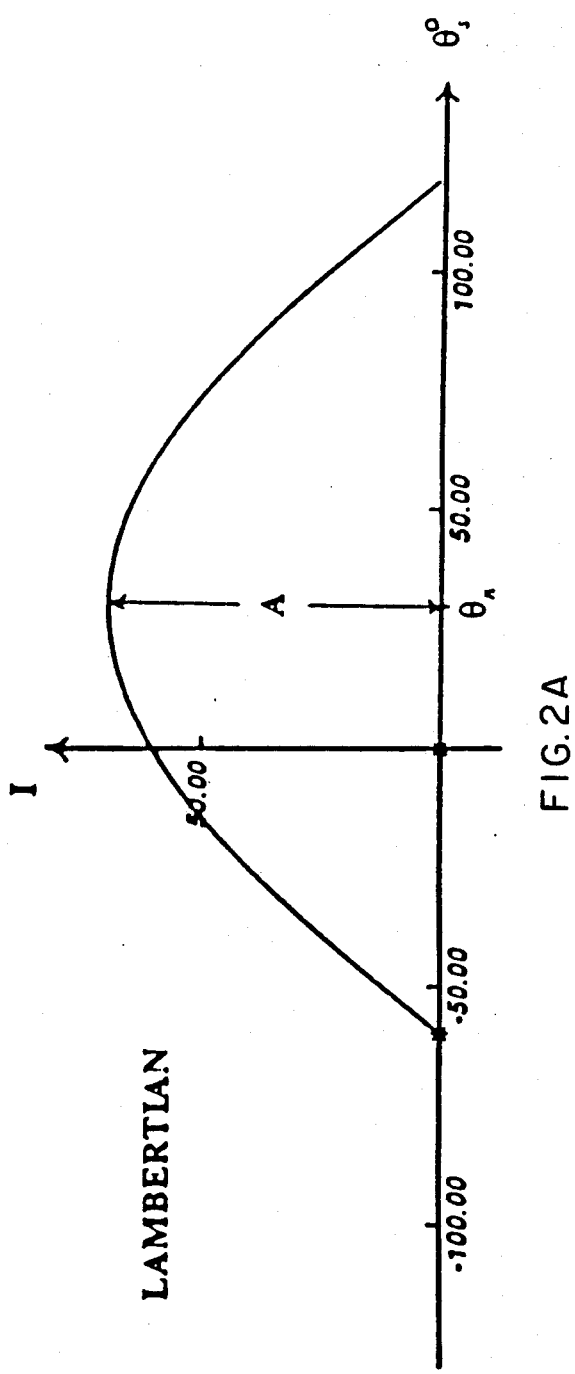
Figure 2B:
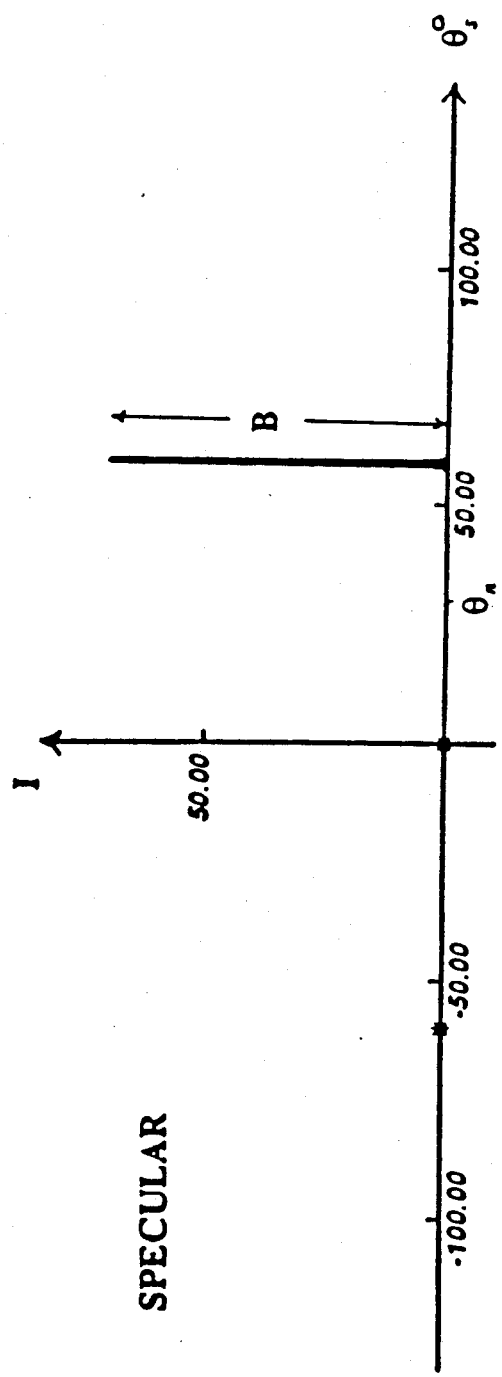

The objective is to determine orientation and reflectance at each surface point from a set of image intensities that result from changing the source direction $\theta_s$. Referring to FIG. 1, by moving the light source 10 around the object surface 12, the source direction can be varied without changing the surface orientation and reflectance parameters. Therefore, even though the orientation and reflectance parameters are unknown, they can be treated as constants in equation (5). For this reason, the basic photometric function is often referred to as $I(\theta_s)$, a relation between image intensity and source direction. FIG. 2 shows plots of the basic photometric function for Lambertian, specular, and hybrid surfaces.

Extended Light Sources

Numerous point source illumination methods have been proposed to extract the shape of either Lambertian or specular surfaces. (See the references cited in an August 1988 Technical Report CMU-RI-TR-88-14 entitled "Extracting Shape and Reflectance of Lambertian, Specular, and Hybrid Surfaces" by the inventors herein.) However, there is no single photometric method available that can measure the shape of Lambertian and specular surfaces or hybrid surfaces that are partly Lambertian and partly specular. The problem associated with the use of point sources is that the specular component of reflection is not detected unless the $\theta_s = 2\theta_n$. In order to determine the shape and reflectance model of hybrid surfaces, the specular and Lambertian components must be captured in the measured intensities. To detect specular reflections from surface points of all orientation, an infinite number of points sources need to be positioned around the surface. Such an approach is unrealistic from the perspective of practical implementations.

Figure 3:
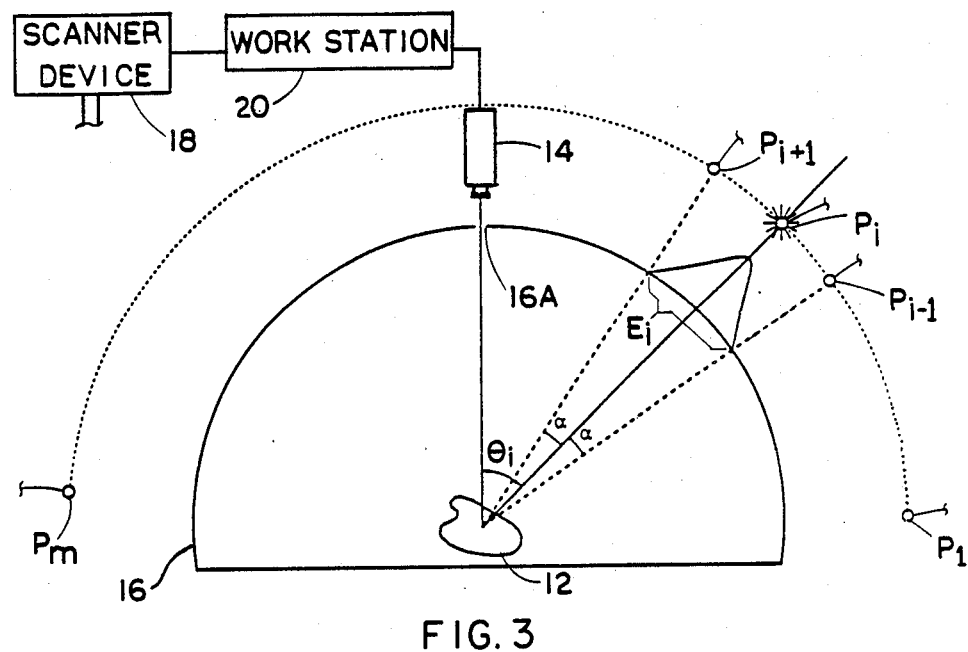
FIG. 3 is a schematic representation of light from an extended source illuminating an object surface and being reflected by the object surface into a viewing camera in accordance with the present invention.

Referring to FIG. 3, it will be seen that the photometric sampling apparatus and method of the present invention uses an array of extended light sources $\{E_i: i=1,2,\ldots M\}$ to illuminate the body surface 12. Unlike a point source 10 as in FIG. 1, an extended source $E_i$ emits light from an area of points rather than a single point. This characteristic of an extended source may be used to ensure the detection of both Lambertian and specular components of reflection.

Experiments have shown that for point source illumination, it is also difficult to measure both Lambertian and specular reflections without changing the sensitivity of the measuring device. Image intensities due to specular reflections have been observed to be much higher than intensities resulting from Lambertian reflections. Therefore, when the sensitivity of a camera is adjusted to detect Lambertian reflections, the specular reflections result in saturated image intensities. When the sensitivity is adjusted to measure intensities of specular reflections, the intensities due to Lambertian reflections are too low to be detected. Extended source illumination tends to make the image intensities due to Lambertian and specular reflections comparable to one another. For extended source illumination, a specular surface element of a given orientation will reflect light from a small area on the extended source into the camera. On the other hand, a Lambertian surface element of the same orientation reflects light from all points on the extended source. This feature of the proposed illumination scheme of the present invention makes it possible to detect both Lambertian and specular reflections in the same image.

In the two-dimensional arrangement of the illumination and imaging geometry of the apparatus of FIG. 3, multiple extended light sources $E_i$ are generated by illuminating a diffuser 16 in the form of a sheet or layer of light-diffusing material preferably of hemispherical configuration with a semi-circular row of spaced point light sources $\{P_i: i=1,2,\ldots M\}$. The point light sources $P_i$ are uniformly distributed and positioned at spaced points outside the hemispherical diffuser 16. All points have the same radiant intensity and are equidistant from the center of the diffuser 16. Adjacent point sources are separated by the source termination angle $\alpha$ and each extended light source $E_i$ has an angular width of $2\alpha$. The radiance functions of the adjacent extended light sources $E_i$ overlap each other for a period of $\alpha$. An extended light source $E_i$ is generated on the surface of the diffuser 16 when any one point source $P_i$ is illuminated. The inspected object 12 is placed at the center of the diffuser 16 and is viewed by the camera 14 through a hole 16A in the diffuser. The arrangement of FIG. 3 is two-dimensional, however, it can be extended to include a third dimension by adding light sources sparsely, but uniformly, distributed over the entire sphere.

Modified Photometric Function

The photometric function for point source illumination, equation (5) above, needs to be modified for extended source illumination. As mentioned above, an extended light source may be thought of as an area of point light sources where each point source has a radiant intensity that is dependent on its position on the area of the extended source. The intensity of light reflected by an object surface that is illuminated by an extended source may be determined by computing the integral of the light energy reflected from all points on the extended source. Therefore, the modified photometric function $I'(\theta_s)$ is determined by convolving the basic photometric function $I(\theta)$ with the extended source radiance function $L(\theta)$. This operation is illustrated in FIG. 4. The radiance function $L(\theta)$ is symmetric about $\theta = \theta_s$, and its magnitude decreases as $\theta$ deviates from $\theta_s$.

Returning to FIG. 3, the multiple extended light sources $E_i$ are generated by scanning the array of point sources, $\{P_i: i=1,2,\ldots M\}$. All sources have the equal radiant intensity and are placed at the same distance from the surface of the diffuser 16. Therefore, each extended source $E_i(\theta_i)$ has the same intensity pattern about its point source direction $\theta_i$. Points on the diffuser 16 that lie in an interval for $\theta_{i-\alpha} < \theta < \theta_i + \alpha$ receive light from the point source $P_i$. Points on the diffuser 16 that lie outside this interval are occluded from the point source by points that lie in the interval and thus $L_i(\theta) = 0$ for $\theta < \theta_i - \alpha$ and $\theta < \theta_i + \alpha$.

Referring to FIGS. 3 and 4, the Lambertian component of the image intensity $I'_i$ due to the extended light source $E_i(\theta_i)$ is:

$$IL' = A' \cos(\theta - \theta_n), \tag{6}$$

where the constant $A'$ determines the strength of the Lambertian component. Similarly, the specular component of image intensity $I'_i$ for the extended light source $E_i(\theta_i)$ is given by:

$$IS' = B'L_i(2\theta_n). \tag{7}$$

The image intensity $I'$ at the surface point with orientation $\theta_n$, resulting from the extended light source $E_i(\theta_i)$ is a combination of the Lambertian component $IL'$ and the specular component $IS'$:

$$I' = A' \cos(\theta_i - \theta_n) = B'L_i(2\theta_n). \tag{8}$$

Equation (8) is the modified photometric function that relates image intensity to surface orientation, surface reflectance, and source position for extended source illumination. In the equation, surface orientation and reflectance parameters are unknown, but constant, for a given surface point. For this reason, the modified photometric function is frequently referred to as $I'(\theta_s)$, a relation between image intensity and extended source direction.

Sampling the Modified Photometric Function

The technique of measuring image intensity $I'_i$ for different source directions $\theta_i$ is equivalent to sampling the modified photometric function $I'(\theta_s)$, as shown in FIG. 5. In one approach, samples of the modified photometric function may be obtained by moving an extended light source around the object and taking images of the object from different source positions. Another approach, which is preferred and shown in FIG. 3, is to distribute an array of extended light sources $E_i$ around the object 12 such that each source illuminates the object from a different direction. The entire array of extended light sources $E_i$ may be sequentially scanned by a scanner device 18 controlled by a workstation 20 such that for each scan a single extended source is active and an image of the object surface 12 is obtained by the camera 14. The representation in FIG. 3 is two-dimensional sampling wherein the surface normal vector, the viewing direction vector, and source direction vectors for all extended sources are coplanar. Discrete extended light source directions are represented by $\theta_i$, and the photometric sampling resulting from an extended source $E_i$ in the direction $\theta_i$ is referred to as $I'_i$. Therefore, the scanning process results in a set of image intensities $\{I'_i: i=1,2, \ldots M\}$ measured at each point on the object surface.

The number of samples measured at each surface point is determined by the frequency $f$ at which $I'(\theta_s)$ is sampled. As stated earlier, in order to extract the shape and reflectance parameters of hybrid surfaces, both Lambertian and specular components of image intensity must be detected. Since a unit impulse specular reflection model has been used, the period of the photometric function that contains specular intensities is equal to the width, $2\alpha$, of the extended source radiance function $L(\theta)$. In general, at least two photometric samples must have non-zero specular intensities for the extraction technique to work. Hence, the photometric function must be sampled at a frequency greater than or equal to the minimum sampling frequency $f_{min}$, where:

$$f_{min} = 1/\alpha.$$

Therefore, by sequentially scanning the array of point sources $\{P_i: i=1,2, \ldots M\}$ at the minimum sampling frequency, a set of intensity values $\{I'_i: i=1,2, \ldots M\}$, are recorded at each point in the image. A computer program or algorithm uses equation (8) to determine the surface orientation $\theta_n$ and the strengths $A'$ and $B'$ of the Lambertian and specular components of reflection at each point in the image, from the set of image intensities measured at that point.

EXTRACTING SHAPE AND REFLECTANCE OF SURFACES

Given the set of image intensities $\{I'_i\}$, what is left is to determine the surface orientation $\theta_n$ and the strengths $A'$ and $B'$ of the Lambertian and specular components of reflection. The shape and reflectance properties extracted at each surface point are solely based on the image intensities recorded at that point. The surface property values assigned to a surface point are not influenced by the image intensities measured at neighboring points.

In practice, purely Lambertian or purely specular surfaces are unlikely occurrences. A large number of surfaces may be classified as hybrid surfaces whose reflectance models are composed of both Lambertian and specular components. Surfaces of plastic objects are examples of hybrid surfaces. An extraction algorithm is used to separate the Lambertian and specular components of each measured image intensity, and for computing surface orientations. The extraction algorithm is based on two constraints, namely the sampling frequency constraint and the unique orientation constraint. By sampling the modified photometric function at the minimum sampling frequency, it is ensured that only two consecutive image intensities in the intensity set contain non-zero specular components of intensity. The physical constraint is that each surface point has a unique orientation. It is important to note that the algorithm is not only capable of determining shape and reflectance properties of hybrid surfaces but also of Lambertian and specular surfaces. A detailed description of the algorithm has been omitted since it not necessary for understanding the photometric sampling apparatus and method of the present invention.

Experiments were conducted on Lambertiam surfaces, specular surfaces, and hybrid surfaces whose reflectance models are composed of both Lambertian and specular components. The results show high accuracy in measured orientations and estimated reflectance models. The Lambertian and specular strengths may be used to segment the image into regions of common reflectance characteristics. The orientations provide a basis for inspecting three-dimensional surface shaped within each region.

In the experimental setup, a 14-inch diameter lamp shade was used as the spherical diffuser and extended light sources were generated on the diffuser's surface by illuminating it using 120V, 100W incandescent light bulbs that are positioned at various locations outside the shade. The inspected object placed at the diffuser center was viewed by a WV-22 model Panasonic CCD camera through a 1-inch diameter hole in the surface of the diffuser. The camera has a 512>480 pixel resolution. The complete imaging system, comprising of lenses and camera, has a physical resolution of 0.002 inch per pixel width. The light bulbs, camera, and object were all placed in the same plane. The two-dimensional setup is only capable of measuring the orientation of surface normal vectors that lie on a single plane in orientation space. For each extended source, an image of the object is digitized and stored in memory. The sequence of object images, generated by scanning the array of extended sources, is processed using the extraction algorithm that is coded on a 3/60 SUM workstation. The surface orientation and reflectance information produced by the extraction algorithm was color-coded and displaced on a color monitor. The apparatus was used to measure surface orientation of objects with surface reflectance properties varying from Lambertian to specular. Objects included a metal bolt wherein the hexagonal shaped head of the bolt had a Lambertian surface, while the threaded section of the bolt had a dominant specular component of reflection. The measured surface orientation was found to be within 2–3% of the actual orientation values.

In summary, the photometric apparatus and method of the present invention has been described herein for determining the shape of Lambertian, specular and hybrid surfaces. Surface shape is determined without prior knowledge of the reflectance properties. Active surface illumination, using extended light sources, makes it possible to capture both Lambertian and specular reflections in the image intensities. Surface orientations and reflectance parameters are computed by using the sampling frequency constraint and the unique orientation constraint. Accurate estimates of surface orientations are obtained by using both Lambertian and specular components of the image intensities. At each surface point, shape and reflectance properties are computed using only image intensities measured at that point. As a result, no shape constraints are needed while determining surface properties.

The photometric sampling apparatus and method may be used to automate a variety of inspection tasks. In many industrial processes, the quality of a manufactured part is determined by its shape and reflectance properties. The shape of a manufactured part may be inspected using the measured surface orientations, while the smoothness or roughness of its machined surface may be determined from the extracted reflectance properties.

It is thought that the present invention and many of its attendant advantages will be understood from the foregoing description and it will be apparent that various changes may be made in the form, construction and arrangement thereof without departing from the spirit and scope of the invention or sacrificing all of its material advantages, the form hereinbefore described being merely a preferred or exemplary embodiment thereof.

We claim:

1. In a system for inspecting and extracting shape and reflectance properties of a surface of an object wherein said reflectance properties range from Lambertian to specular reflections and include hybrids thereof, an apparatus for photometrically sampling a sequence of images of said object surface, comprising:
    (a) means for defining an array of point light sources spaced apart from one another in an arcuate configuration about a common site at which the object is placed for inspection and being activatable for emitting light from said point sources along different orientation angles toward the object when placed at said common site;
    (b) means for intercepting light emitted from said point sources and in response thereto generating an array of extended light sources spaced apart from one another in an arcuate configuration about and oriented in different directions toward said common site, each extended source emitting light from an area of points unlike each point source which emits light from a single point; and
    (c) means for viewing the object at the common site from a single direction to extract information corresponding to the image of the object viewed.

2. The apparatus as recited in claim 1, wherein said extended light source generating means is a layer of light-diffusing material disposed between said common site and said array of point light sources.

3. The apparatus as recited in claim 2, wherein said layer is light-diffusing globe having an arcuate configuration.

4. The apparatus as recited in claim 3, wherein said globe has at least a hemispherical configuration.

5. The apparatus as recited in claim 4, wherein said common site for inspection of the object is at the center of said globe.

6. The apparatus as recited in claim 3, wherein said extended light sources are generated on a surface of said globe.

7. The apparatus as recited in claim 1, wherein said point light sources have generally the same radiant energies.

8. The apparatus as recited in claim 1, wherein said point light sources are equidistant from the common site.

9. The apparatus as recited in claim 1, further comprising:
    means for sequentially activating said defining means to emit light from said point sources and in response thereto to generate said extended light sources in a scanning fashion for producing a sequence of images of the object at said viewing means.

10. The apparatus as recited in claim 1, wherein each of said point light sources are spaced apart at predetermined relationships such that the respective radiances of adjacent ones of said extended light sources overlap one another.

11. In a system for inspecting and extracting shape and reflectance properties of a surface of an object wherein said reflectance properties range from Lambertian to specular reflections and include hybrids thereof, a method for photometrically sampling a sequence of images of said object surface, comprising the steps of:
    (a) defining an array of point light sources spaced apart from one another in an arcuate configuration about a common site at which the object is to be placed for inspection;
    (b) placing the object at the common site;
    (c) activating the point light sources for sequentially emitting light therefrom along different orientation angles toward the object at the common site;

(d) generating, in response to the light sequentially emitted from the point sources, an array of extended light sources spaced apart from one another in an arcuate configuration about and oriented in different directions toward the common site, each extended source emitting light from an area of points unlike each point source which emits light from a single point; and (e) viewing the object at the common site from a single direction to extract information corresponding to the image of the object viewed.

12. The method as recited in claim 11, wherein each extended source emits light from an area of points unlike each point source which emits light from a single point.

13. The method as recited in claim 11, wherein said generating includes passing light emitted from said point sources through a layer of light-diffusing material disposed between said common site and said array of point light sources.

14. The method as recited in claim 13, wherein said layer is a light-diffusing globe having an arcuate configuration.

15. The method as recited in claim 14, wherein said globe has at least a hemispherical configuration.

16. The method as recited in claim 14, wherein said extended light sources are generated on a surface of said globe.

17. The method as recited in claim 11, wherein said emitting of light from said point sources is at the same radiant energies.

18. The method as recited in claim 11, wherein light from said point light sources is emitted equidistant from the common site.

* * * * *